(12) United States Patent
Do et al.

(10) Patent No.: US 8,368,952 B2
(45) Date of Patent: Feb. 5, 2013

(54) IMAGE PROCESSING APPARATUS AND CONTROL METHOD THE SAME

(75) Inventors: Ducmnhquan Do, Suwon-si (KR); Sung Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 12/043,339

(22) Filed: Mar. 6, 2008

(65) Prior Publication Data

US 2008/0218783 A1 Sep. 11, 2008

(30) Foreign Application Priority Data

Mar. 7, 2007 (KR) .......... 10-2007-0022604
Feb. 25, 2008 (KR) .......... 10-2008-0016780

(51) Int. Cl.
*G06F 15/00* (2006.01)

(52) U.S. Cl. ......... 358/1.9; 358/518; 358/3.21; 358/2.1; 382/164; 382/165

(58) Field of Classification Search ............ 358/1.9, 358/518, 3.21, 2.1; 382/165, 164
See application file for complete search history.

(56) References Cited

U.S. PATENT DOCUMENTS

| | | | |
|---|---|---|---|
| 5,311,328 A | | 5/1994 | Murata |
| 5,357,353 A | | 10/1994 | Hirota |
| 5,555,107 A | * | 9/1996 | Funada et al. ............ 358/518 |
| 5,732,153 A | | 3/1998 | Ohsawa |
| 5,771,107 A | | 6/1998 | Fujimoto et al. |
| 6,701,009 B1 | * | 3/2004 | Makoto et al. ............ 382/164 |
| 6,937,756 B2 | | 8/2005 | Tanioka et al. |
| 7,079,685 B1 | | 7/2006 | Hirota et al. |
| 7,557,963 B2 | * | 7/2009 | Bhattacharjya ............ 358/3.27 |
| 7,990,579 B2 | * | 8/2011 | Misaizu et al. ............ 358/2.1 |
| 2002/0081023 A1 | * | 6/2002 | Uchida .................... 382/165 |
| 2007/0206228 A1 | * | 9/2007 | Miyagi .................... 358/3.21 |

FOREIGN PATENT DOCUMENTS

EP 0 410 700 1/1991

OTHER PUBLICATIONS

European Search Report dated Jun. 25, 2008 issued in EP 08102292.3.

* cited by examiner

*Primary Examiner* — Twyler Haskins
*Assistant Examiner* — Michael Burleson
(74) *Attorney, Agent, or Firm* — Stanzione & Kim, LLP

(57) ABSTRACT

A method of controlling an image processing apparatus, and an image processing apparatus to carry-out the method. The edge pixels of a black character may be evaluated to improve visibility of edge pixels and to enhance the blackening of the edge pixels when the evaluated edge pixels are determined to be the actual edge pixels of the original image and to correct the edge pixels to be suitable for original background pixel values and to brighten the edge pixels when the evaluated edge pixels are determined to be the actual background pixels of an original image. The black character may be enhanced so that the actual black character becomes blacker and that the background pixels become brighter to improve the visibility of the black character. The black character may be distinguished from a scanned image, the print thickness of the distinguished black character may be controlled, and the black character having controlled print thickness may be printed out using only a K color.

17 Claims, 6 Drawing Sheets

FIG. 5
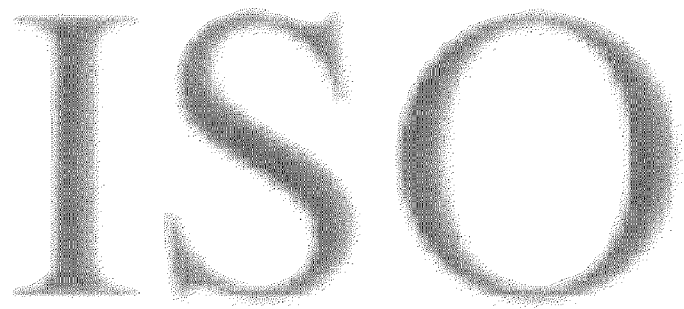
(a) Scanned input,
(b) α=0.5 sharpening
(c) α=0.6 sharpening FIG. 6
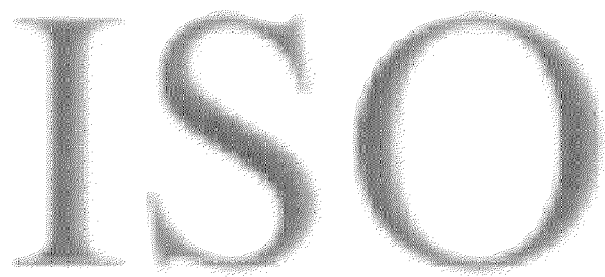
(a) Scanned input
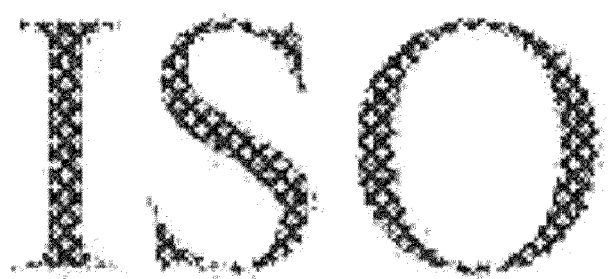
(b) Binarized result after α=0.5 sharpening
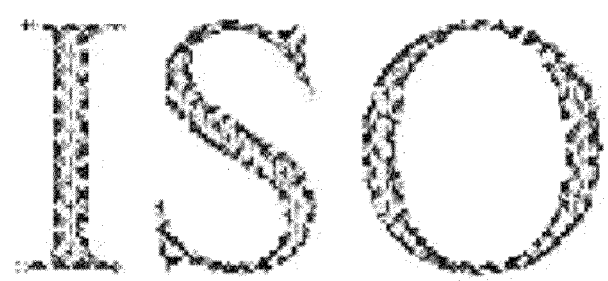
(c) Binarized result after α=0.6 sharpening
(d) Binarized result after α=0.6 sharpening and blackening

IMAGE PROCESSING APPARATUS AND CONTROL METHOD THE SAME

CROSS-REFERENCE TO RELATED APPLICATIONS

This application claims the benefit of Korean Patent Application No. 2007-22604, filed on Mar. 7, 2007 and Korean Patent Application No. 2008-16780, filed Feb. 25, 2008 in the Korean Intellectual Property Office, the disclosure of which is hereby incorporated in its entirety by reference.

BACKGROUND OF THE INVENTION

1. Field of the Invention

The present general inventive concept relates generally to a method of controlling an image processing apparatus, and more particularly to a method of controlling an image processing apparatus to improve reduction quality of an image by improving visibility of a black character, and an apparatus to carry-out the method.

2. Description of the Related Art

In general, an image processing apparatus converts a document created by a user who wishes to perform printing through an application program or an image photographed by a user using a digital camera into coded data to print the data to a recording paper so that the user can see the data. Such an image processing apparatus typically includes a printer, a scanner, a copy machine, or a facsimile.

An image processing apparatus capable of performing color printing includes toners of various colors such as cyan, magenta, yellow, and black (CMYK). The color image is then printed out by combining colors of the toners.

After the color image is binarized, black pixels are expressed by a combination of the C, M, Y, and K colors, which may cause toner dispersion or noise around an edge of the color image during reproduction. Furthermore, when such a combination is used, the obtained black color is different from the original black color because the level of the obtained black color is lower than the level of the original black color. As a result, reproduction quality deteriorates.

For this reason, as disclosed in U.S. Pat. No. 6,937,756, the pixels that belong to a black line image are printed using the K color to enhance a black image. That is, a K channel is enhanced and C, M, and Y channels are suppressed in order to increase the black level.

However, when an input image is scanned, the edge pixels of a black character are commonly blurred. This means that only a part of the edge pixels are determined to be the edge pixels of the black character. As a result, the printed character and thin lines may appear thicker than the originals and/or may be printed out with lower resolution.

SUMMARY OF THE INVENTION

The present general inventive concept provides a method of controlling an image processing apparatus capable of improving reproduction quality of an image by improving visibility of a black character.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may provide a method of controlling an image processing apparatus, the method including distinguishing a black character from a scanned image, controlling a print thickness of the distinguished black character, and printing out the black character having the controlled print thickness by using only a K color.

The method may further include determining whether a subject pixel of the distinguished black character is an edge pixel or a background pixel of an original image.

The subject pixel may be corrected by a value of an edge pixel when it is determined that the subject pixel of the distinguished black character is an edge pixel of an original image, and may be corrected by a value of a background pixel when it is determined that the subject pixel of the distinguished black character is a background pixel.

A window, on which the subject pixel of the distinguished black character may be centered, may be set to determine a maximum value and a minimum value among pixels in the window, to calculate a threshold value based on the maximum and minimum values, and to compare the calculated threshold value with the subject pixel such that if a value of the subject pixel is less than the threshold value, the subject pixel may be determined to be an edge pixel, and if the value of the subject pixel is not less than the threshold value, the subject pixel may be determined to be a background pixel.

The thickness of the black character may be reduced as the threshold value approaches the minimum value, and the thickness of the black character may be increased as the threshold value approaches the maximum value.

The threshold value may be smaller than an average value of the maximum value and the minimum value.

The foregoing and/or other aspects and utilities of the present general inventive concept may also provide a method of controlling an image processing apparatus, including distinguishing a black character from a scanned image, distinguishing edge pixels of the distinguished black character, setting a window, on which a subject pixel is centered, to determine a maximum value and a minimum value among pixels in the window, calculating a threshold value based on the maximum and minimum values, determining whether the subject pixel is an edge pixel or a background pixel of an original image based on the calculated threshold value, correcting the subject pixel to be suitable for the edge pixel when it is determined that the subject pixel is the edge pixel and correcting the subject pixel to be suitable for the background pixel when it is determined that the subject pixel is the background pixel, and printing the black character using only a K color in consideration of a result from the correcting operation.

The threshold value may be smaller than an average value of the maximum value and the minimum value.

The edge pixel value may be smaller than an inner pixel value.

The foregoing and/or other aspects and utilities of the present general inventive concept may further provide an image processing apparatus, including an image input unit to read an image, a black character detecting unit to detect an edge region of a black character from the read image, and a black character enhancing unit to determine whether pixels in the edge region are edge pixels or background pixels, and to correct the pixels in the edge region based on the determination by the black character enhancing unit.

The image processing unit may further include a processing unit to obtain pixel values of the black character, and the black character enhancing unit may determine a threshold value calculated from a set of maximum and minimum values from pixels in the edge region.

The black character detecting unit may divide the black character into a black character region, a background region, and the edge region based on pixel values obtained by the processing unit.

The pixels in the edge region may be darkened or brightened to be suitable for pixels in the black character region or background region, respectively, based on the determination by the black character enhancing unit.

The threshold value may be variably controlled by a character thickness variable.

The image processing apparatus may further include an image output unit to output an enhanced image corrected by the black character enhancing unit.

The image processing apparatus may further include a preprocessing unit to obtain image data expressed by hue, luminance, and/or saturation components corresponding to pixel values of the black character.

The image processing apparatus may further include a post-processing unit to process the black character enhanced by the black character enhancing unit so that the enhanced black character may be printed.

The foregoing and/or other aspects and utilities of the present general inventive concept may further provide an image processing apparatus, including a black character detecting unit to distinguish a black character from a scanned image, a black character enhancing unit to control a print thickness of the distinguished black character, and an image output unit to print out the black character having the controlled print thickness by using only a K color.

The foregoing and/or other aspects and utilities of the present general inventive concept may further provide an image processing apparatus, including a black character detecting unit to distinguish a black character from a scanned image and to distinguish edge pixels of the black character, a black character enhancing unit having a window on which a subject pixel is centered to determine a maximum value and a minimum value among pixels in the window, to calculate a threshold value based on the maximum and minimum values, to determine whether the subject pixel is an edge pixel or a background pixel of an original image based on the calculated threshold value, to correct the subject pixel to be suitable for the edge pixel when it is determined that the subject pixel is the edge pixel, and to correct the subject pixel to be suitable for the background pixel when it is determined that the subject pixel is the background pixel, and an image output unit to print the black character enhanced by the black character enhancing unit using only a K color.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 5 is a view illustrating a result after the edge of the black character is cleared according to an embodiment of the present general inventive concept; and FIG. 6 is a view illustrating a result after the edge of the black character is cleared and then binarized according to an embodiment of the present general inventive concept.

DETAILED DESCRIPTION OF THE PREFERRED EMBODIMENTS

Figure 1:
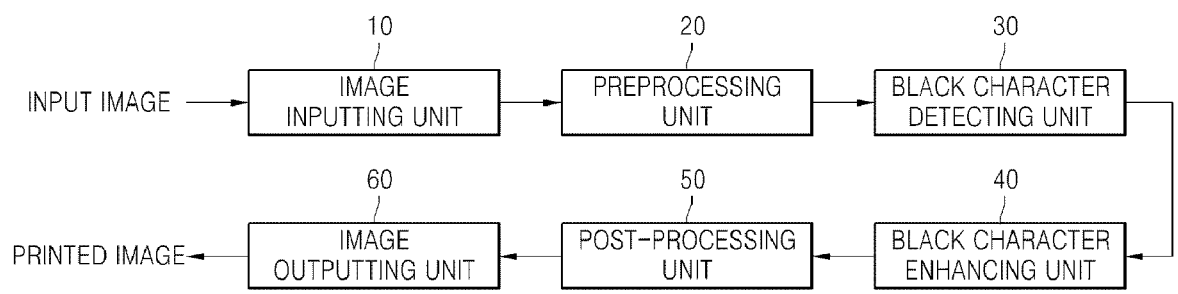
FIG. 1 is a block diagram illustrating an image processing apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image processing apparatus according to an embodiment of the present general inventive concept. Referring to FIG. 1, the image processing apparatus may include an image input unit 10 to read an image, a preprocessing unit 20 to preprocess the image read through the image input unit 10, a black character detecting unit 30 to detect a black character from the image preprocessed through the preprocessing unit 20, a black character enhancing unit 40 to enhance the edge pixels of the black character detected by the black character detecting unit 30, a post-processing unit 50 to post-process the black character enhanced by the black character enhancing unit 40 so that the black character can be printed, and an image output unit 60 to print out or otherwise output the image that may be post-processed by the post-processing unit 50. The image processing apparatus may be an apparatus, for example, a host computer to provide the black character, or an image forming apparatus to process and print the black character. The image input unit 10 may be a scanner to scan an image from a medium as an input image, or an interface to receive data as an input image.

The preprocessing unit 20 may obtain image data expressed by hue, luminance, and saturation components corresponding to the respective pixels, that is, pixel values using the R, G and B components of the image of a document scanned by a scanner.

The black character detecting unit 30 may divide each subject pixel into a black character region, a background region, and an edge region of the black character using the pixel values preprocessed by the preprocessing unit 20, for example, luminance data to determine whether each subject pixel is a background pixel or a pixel of the black character.

The black character enhancing unit 40 may include a window centered by the edge pixels of the black character detected by the black character detecting unit 30 in order to determine the maximum and minimum values among the pixels in the window. The black character enhancing unit 40 may then calculate a threshold value based on the maximum and minimum values in order to determine whether the pixels of the black character detected by the black character detecting unit 30 may be characterized as edge pixels or background pixels, may clear the determined edge pixels of the black character detected by the black character detecting unit 30, and may correct the value of the determined background pixels to the original background pixels to enhance the black character.

Figure 2:
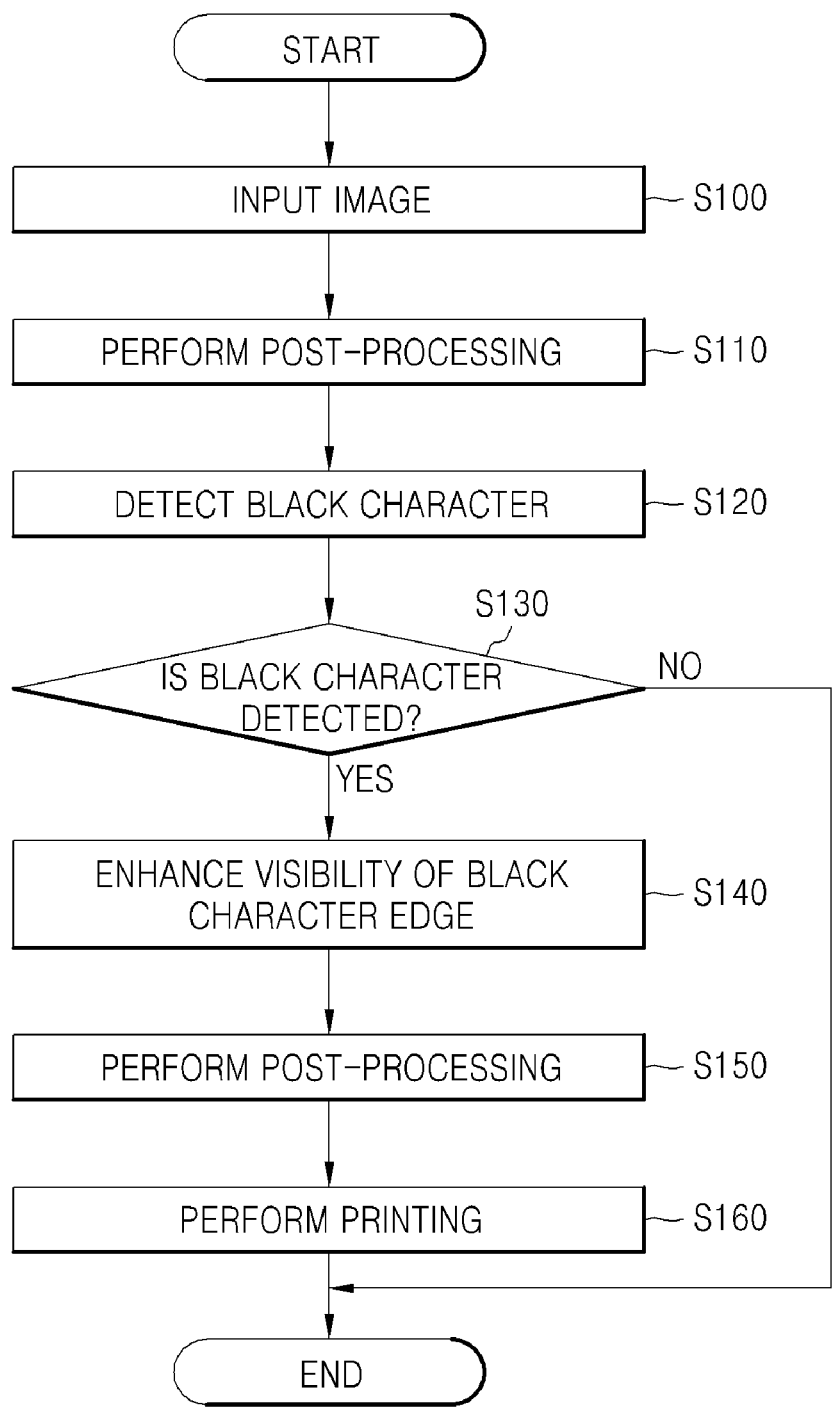
FIG. 2 is a flowchart illustrating a control procedure of an image processing apparatus according to an embodiment of the present general inventive concept.

FIG. 2 is a flowchart of a method of controlling the image processing apparatus according to an embodiment of the present general inventive concept. Referring to FIG. 2, the method of controlling the image processing apparatus may include an image inputting process (S100), a preprocessing process (S110), black character enhancing processes (S120 to S140), a post-processing process (S150), and a printing process (S160). The black character enhancing processes (S120 to S140) may include a black character detecting process (S120), a black character detection determining process (S130), and a black character edge visibility enhancing process (S140).

As described above, and as illustrated in FIG. 5A, when an original image is scanned, pixels in a transition region between the black character and the background appear vague for various reasons. If this phenomenon is not properly processed, a reproduced black character may appear thicker and vaguer in comparison with the original.

Therefore, in the black character enhancing processes (S120 to S140) of the present general inventive concept, the vague subject pixels that are determined to be the actual background pixels of the original image may be brightened to be suitable with the background pixel values of the original image, and the vague subject pixels that are determined to be the actual edge pixels of the original image may be darkened to be suitable with the edge pixel values of the original image, to improve the visibility of the black character. Therefore, the subject edge pixels of the black character may be evaluated to improve the visibility of the edge pixels and to enhance the blackening of the edge pixels when the evaluated edge pixels are determined to be the actual edge pixels of the original image, and to correct the evaluated edge pixels to be suitable for the original background pixel values when the evaluated edge pixels are determined to be the actual background pixels of the original image.

Figure 3:
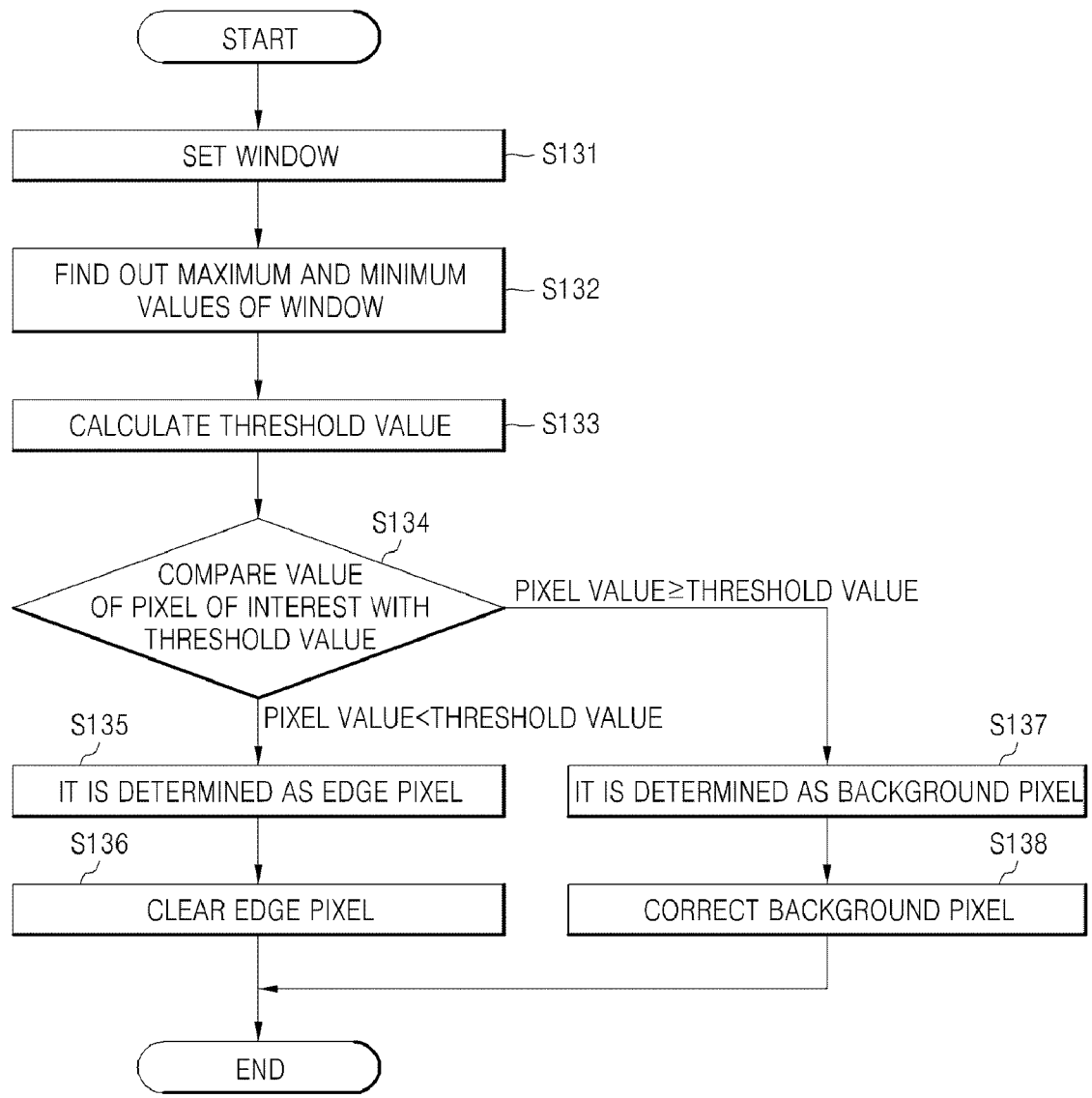
FIG. 3 is a flowchart illustrating processes of enhancing visibility of edge pixels of a black character in accordance with FIG. 2.

FIG. 3 is a flowchart illustrating processes to enhance visibility of the edge pixels of a black character in accordance with FIG. 2. Referring to FIG. 3, the black character enhancing unit 40 may set a window centered by a subject pixel of the black character (S131) to find out the maximum value and the minimum value among the pixel values in the set window (S132).

Then, a threshold value may be calculated using the found maximum and minimum values to determine whether the subject pixel is an edge pixel or a background pixel in the original image (S133).

Then, the value of the subject pixel may be compared with the threshold value (S134).

If it is determined that the value of the subject pixel is less than the threshold value, the subject pixel may be determined to be an edge pixel of the original image (S135). When the subject pixel is determined to be an edge pixel, the value of the subject pixel may be reduced to blacken and clear the edge pixel (S136).

On the other hand, if it is determined that the value of the subject pixel is not less than the threshold value, the subject pixel may be determined to be a background pixel of the original image (S137). When the subject pixel is determined to be a background pixel, the value of the subject pixel may be increased to white to correct the background pixel (S138).

Figure 4:
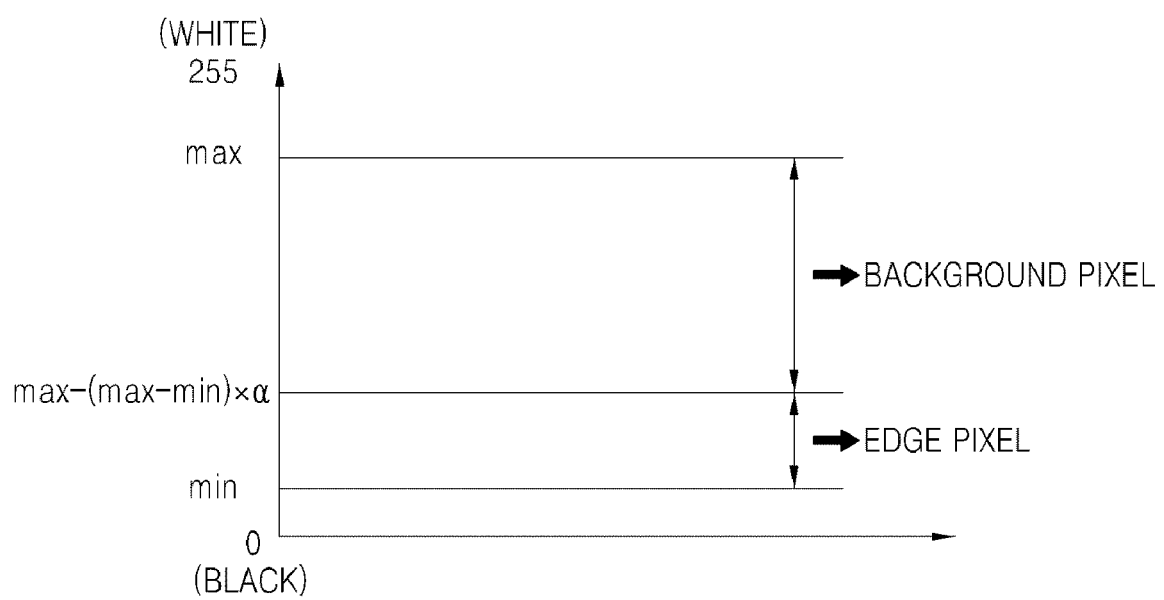
FIG. 4 is a view illustrating the threshold value function of FIG. 3.

The threshold value may be defined as max-(max-min)*$\alpha$ as illustrated in FIG. 4. Here, $\alpha$ may be an actual value in the range between 0 and 1. This value may be referred to as a character thickness variable. The $\alpha$ value may be controlled to increase or reduce the threshold value. That is, more or less pixels may be darkened by changing the value of $\alpha$.

For example, the threshold value may become closer to the maximum value as $\alpha$ becomes closer to 0, and closer to the minimum value as $\alpha$ becomes closer to 1. When the threshold value is closer to the maximum value, more pixels may be darkened and less pixels may be brightened. Therefore, the printed and output character may appear thicker and vaguer. On the other hand, when the threshold value is closer to the minimum value, less pixels may be darkened and more pixels may be brightened. The $\alpha$ value may depend on the characteristic of a scanner. The $\alpha$ value may be controlled so that the thickness of the printed character may be controlled.

FIG. 5 illustrates a result of clearing the edge of the black character according to an embodiment of the present general inventive concept. FIG. 6 illustrates a result of clearing the edge of the black character, and then binarizing the edge of the black character according to an embodiment of the present general inventive concept.

As illustrated in FIGS. 5 and 6, the black character may appear clearer and thinner when the threshold value is set to $\alpha$=0.6 compared to when a threshold value of $\alpha$=0.5 is applied. Furthermore, a binarizing result may be enhanced. After binarization, since the black character may be provided by a combination of C, M, Y, and K colors, the printed black character may not appear black due to the existence of noise around the edge pixels. However, in accordance with the present general inventive concept, because the edge regions of the black character are made clear, and because the C, M, and Y channels of the black character pixels are limited to 255 so that only the K color may be used instead of a combination of the C, M, Y, and K colors, the printed black character appears completely black and it is possible to reduce unwanted noise around the black character.

As described above, according to the present general inventive concept, the edge pixels of the black character may be evaluated to improve the visibility of the edge pixels and to enhance the blackening of the edge pixels when the evaluated edge pixels are determined to be the actual edge pixels of the original image and to correct the edge pixels to be suitable for original background pixel values and to brighten the edge pixels when the evaluated edge pixels are determined to be the actual background pixels of the original image. Therefore, the black character may be enhanced so that the actual black character may become blacker and the background pixels may become brighter. As a result, it is possible to improve the visibility of the black character.

In addition, according to the present general inventive concept, the black character may be printed by using only the K color so that it may be possible to improve the visibility of the black character and to reduce noises of the black character.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling an image processing apparatus, the method comprising:
   obtaining image data expressed by hue, luminance, and saturation components corresponding to the respective pixels using R, G, and B components of an image of a document scanned by a scanner;
   distinguishing a black character from a scanned image;
   determining whether a subject pixel of the distinguished black character is an edge pixel or a background pixel of an original image, by comparing the subject pixel with a calculated threshold value based on the maximum and minimum values among pixels in a window on which the subject pixel of the distinguished black character is centered;
   controlling a print thickness of the distinguished black character based on whether the subject pixel is the edge pixel; and
   printing out the black character having the controlled print thickness by using only a K color.

2. The method of claim 1, further comprising:
   correcting the subject pixel by a value of the edge pixel when it is determined that the subject pixel of the distinguished black character is the edge pixel of the original image; and
   correcting the subject pixel by a value of a background pixel when it is determined that the subject pixel of the distinguished black character is the background pixel of the original image.

3. The method of claim 1, further comprising:
   setting a window on which the subject pixel of the distinguished black character is centered to determine a maximum value and a minimum value among pixels in the window;
   calculating a threshold value based on the maximum and minimum values; and
   comparing the calculated threshold value with the subject pixel such that:
      if a value of the subject pixel is less than the threshold value, the subject pixel is determined to be an edge pixel; and
      if the value of the subject pixel is not less than the threshold value, the subject pixel is determined to be a background pixel.

4. The method of claim 3, further comprising:
   reducing a thickness of the black character as the threshold value approaches the minimum value; and
   increasing the thickness of the black character as the threshold value approaches the maximum value.

5. The method of claim 3, wherein the threshold value is less than an average value of the maximum value and the minimum value.

6. A method of controlling an image processing apparatus, the method comprising:
   obtaining image data expressed by hue, luminance, and saturation components corresponding to the respective pixels using R, G, and B components of an image of a document scanned by a scanner;
   distinguishing a black character from the scanned image by using the image data;
   distinguishing edge pixels of the distinguished black character;
   setting a window, on which a subject pixel is centered, to determine a maximum value and a minimum value among pixels in the window;
   calculating a threshold value based on the maximum and minimum values;
   determining whether the subject pixel is an edge pixel or a background pixel of an original image based on the calculated threshold value such that when a value of the subject pixel is less than the calculated threshold value, the subject pixel is the edge pixel;
   correcting the subject pixel to be suitable for the edge pixel when it is determined that the subject pixel is the edge pixel and correcting the subject pixel to be suitable for the background pixel when it is determined that the subject pixel is the background pixel; and
   printing the black character using only a K color in consideration of a result from the correcting.

7. The method of claim 6, wherein the threshold value is less than an average value of the maximum value and the minimum value.

8. The method of claim 6, wherein the edge pixel value is less than an inner pixel value.

9. An image processing apparatus, comprising:
   an image input unit to read an image;
   a preprocessing unit to obtain image data expressed by hue, luminance, and/or saturation components corresponding to pixel values of a black character
   a black character detecting unit to detect an edge region of the black character from the read image; and
   a black character enhancing unit to determine whether a pixel in an edge region is an edge pixel or a background pixel, to determine that the pixel is the edge pixel if a value of the pixel is less than a threshold value, and to correct the pixels in the edge region based on the determination by the black character enhancing unit.

10. The image processing apparatus of claim 9, further comprising:
    a processing unit to obtain pixel values of the black character, wherein the determination by the black character enhancing unit is based on the threshold value calculated from a set of maximum and minimum values from the pixels in the edge region.

11. The image processing apparatus of claim 10, wherein the black character detecting unit divides the black character into a black character region, a background region, and the edge region based on the pixel values obtained by the processing unit.

12. The image processing apparatus of claim 11, wherein the pixels in the edge region are darkened or brightened to be suitable for pixels in the black character region or the background region, respectively, based on the determination by the black character enhancing unit.

13. The image processing apparatus of claim 10, wherein the threshold value may be variably controlled by a character thickness variable.

14. The image processing apparatus of claim 9, further comprising:
    an image output unit to output an enhanced image corrected by the black character enhancing unit.

15. The image processing apparatus of claim 9, further comprising:
    a post-processing unit to process the black character enhanced by the black character enhancing unit so that the enhanced black character may be printed.

16. An image processing apparatus, comprising:
    a preprocessor to obtain image data expressed by hue, luminance, and saturation components corresponding to the respective pixels using R, G, and B components of an image of a document scanned by a scanner;

a black character detecting unit to distinguish a black character from the scanned image by using the image data;

a black character enhancing unit to control a print thickness of the distinguished black character based on whether the subject pixel of the distinguished black character is determined to be an edge pixel or a background pixel of an original image, by comparing the subject pixel with a calculated threshold value based on the maximum and minimum values among pixels in a window on which the subject pixel of the distinguished black character is centered; and an image output unit to print out the black character having the controlled print thickness by using only a K color.

17. An image processing apparatus, comprising:

a preprocessor to obtain image data expressed by hue, luminance, and saturation components corresponding to the respective pixels using R, G, and B components of an image of a document scanned by a scanner;

a black character detecting unit to distinguish a black character from a scanned image and to distinguish an edge pixel of the black character by using the image data;

a black character enhancing unit to set a window on which a subject pixel is centered to determine a maximum value and a minimum value among pixels in the window, to calculate a threshold value based on the maximum and minimum values, to determine whether the subject pixel is the edge pixel or a background pixel of an original image based on the calculated threshold value, the subject pixel being the edge pixel when a value of the subject pixel is less than the calculated threshold value, to correct the subject pixel to be suitable for the edge pixel when it is determined that the subject pixel is the edge pixel, and to correct the subject pixel to be suitable for the background pixel when it is determined that the subject pixel is the background pixel; and an image output unit to print the black character enhanced by the black character enhancing unit using only a K color.

* * * * *